United States Patent
Ottaviani et al.

(10) Patent No.: US 7,462,666 B2
(45) Date of Patent: Dec. 9, 2008

(54) METHOD FOR MAKING NANOCOMPOSITE MATERIALS

(75) Inventors: Robert Augustine Ottaviani, Anthem, AZ (US); William R. Rodgers, Bloomfield Township, MI (US); Paula D. Fasulo, Eastpointe, MI (US); David A. Okonski, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 460 days.

(21) Appl. No.: 10/843,228

(22) Filed: May 11, 2004

(65) Prior Publication Data

US 2005/0256242 A1 Nov. 17, 2005

(51) Int. Cl.
C08K 3/34 (2006.01)
C08J 3/20 (2006.01)
(52) U.S. Cl. ...................... 524/445; 524/447
(58) Field of Classification Search ................ 524/445, 524/447; 501/145
See application file for complete search history.

(56) References Cited

U.S. PATENT DOCUMENTS

| | | | |
|---|---|---|---|
| 6,339,121 B1 | 1/2002 | Rafailovich et al. | |
| 6,407,155 B1 * | 6/2002 | Qian et al. | 524/445 |
| 6,469,073 B1 * | 10/2002 | Manke et al. | 523/216 |
| 6,753,360 B2 * | 6/2004 | Mielewski et al. | 523/216 |
| 2005/0131126 A1 * | 6/2005 | Yang et al. | 524/445 |
| 2006/0252871 A1 * | 11/2006 | Baird et al. | 524/445 |

OTHER PUBLICATIONS

Mielewski, D., E. Lee, and R. Baird, *Progress in the Development of Polyolefin-Based Nanocomposite Materials*, Society for the Advancement of Material and Process Engineering—Midwest Advanced Materials and Processing Conferences, 4 pages (Sep. 12-14, 2000).

Elkovitch, M., L. Lee, and D. Tomasko, Effect of Supercritical Carbon Dioxide on Morphology Development During Polymer Blending, *Polymer Engineering and Science*, vol. 40, No. 8, pp. 1850-1861 (Aug. 2000).

\* cited by examiner

*Primary Examiner*—Katarzyna Wyrozebski

(57) ABSTRACT

A method for making a nanocomposite material includes introducing a solution including a nanofiller material and a supercritical fluid into a molten polymeric material within an extruder. The supercritical fluid is caused to substantially instantaneously convert to a gas phase, thereby forming the nanocomposite material having the nanofiller material substantially homogeneously dispersed therein.

35 Claims, 1 Drawing Sheet

METHOD FOR MAKING NANOCOMPOSITE MATERIALS

TECHNICAL FIELD

The present invention relates generally to nanocomposites, and more particularly to the formation of nanocomposite materials.

BACKGROUND OF THE INVENTION

Nanotechnology can be defined as materials or devices engineered at the molecular level. Within this category are polymer nanocomposites, which are a class of materials that use molecular sized particles for reinforcing the polymer matrix, e.g. the reinforcing filler possesses one or more dimensions on a sub-micrometer scale. These materials blend a nanofiller with a polymer to produce a composite with equal or better physical and mechanical properties than their conventionally filled counterparts but at lower filler loadings.

Due to the surface area available with nanofillers, polymer nanocomposites offer the potential for enhanced mechanical properties, barrier properties, thermal properties, and flame retardant properties when compared to conventionally filled materials.

One class of polymer nanocomposites uses a filler material that is based on the smectite class of aluminum silicate clays, a common representative of which is montmorillonite.

When exfoliated properly, these layered silicates have size dimensions approximately 1 nm thick by about 50 to 2000 nm long. This leads to aspect ratios on the order of about 50 to 2000. This value is quite high compared to the aspect ratio of conventional fillers such as talc (aspect ratio ~1) and glass fibers (aspect ratio ~20). Due, at least in part, to this high aspect ratio, there is the potential to obtain properties equal to or greater than conventionally filled materials but at much lower filler loadings, for example, between about 2% and about 5%. Conventionally filled materials require 20 to 30% loadings to achieve equivalent property enhancement.

For optimum reinforcement properties, not only is good exfoliation desirable, but also good distribution of the silicate layers throughout the resin, and good compatibility between the polymer resin and the filler.

However, one of the limits of current nanocomposite materials, made via melt processing for example, is a potential lack of development of a high degree of exfoliation (dispersion) of the nanofiller material.

SUMMARY OF THE INVENTION

Embodiments of the present invention provide novel methods for making non-foam nanocomposite materials using foam processing. One embodiment of the method includes introducing a solution including a nanofiller material and a supercritical fluid into a molten polymeric material within an extruder. The supercritical fluid is caused to substantially instantaneously convert to a gas phase, thereby forming the non-foam nanocomposite material having the nanofiller material substantially homogeneously dispersed therein.

In an alternate embodiment of the method, the solution is introduced into a space in the barrel of the extruder between the barrel inside wall and the molten polymeric material therein. The supercritical fluid is caused to substantially instantaneously convert to a gas phase, thereby forming a powdered nanofiller material on the molten polymeric material. The powder covered molten polymeric material is passed through the extruder, thereby forming the non-foam nanocomposite material having the nanofiller material substantially homogeneously dispersed therein.

BRIEF DESCRIPTION OF THE DRAWINGS

Objects, features and advantages of embodiments of the present invention may become apparent upon reference to the following detailed description and drawings, in which.

DESCRIPTION OF THE PREFERRED EMBODIMENT

The present invention is predicated upon the unexpected and fortuitous discovery that the use of a supercritical fluid foaming agent in the process of preparing a non-foam nanocomposite material may substantially increase the exfoliation of the nanofiller material within the nanocomposite material. It is believed that this increased exfoliation of the nanofiller material may advantageously enhance the mechanical properties of the nanocomposite material.

Figure 1A:
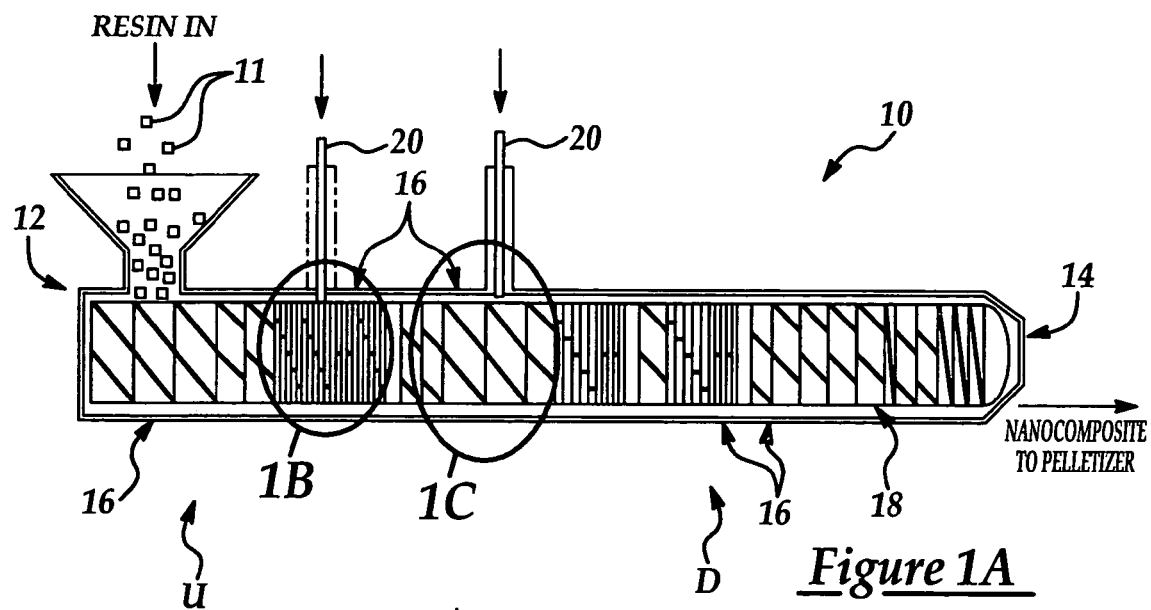
FIG. 1A is a schematic view of an extruder having the molten polymeric material therein.
Figure 1B:
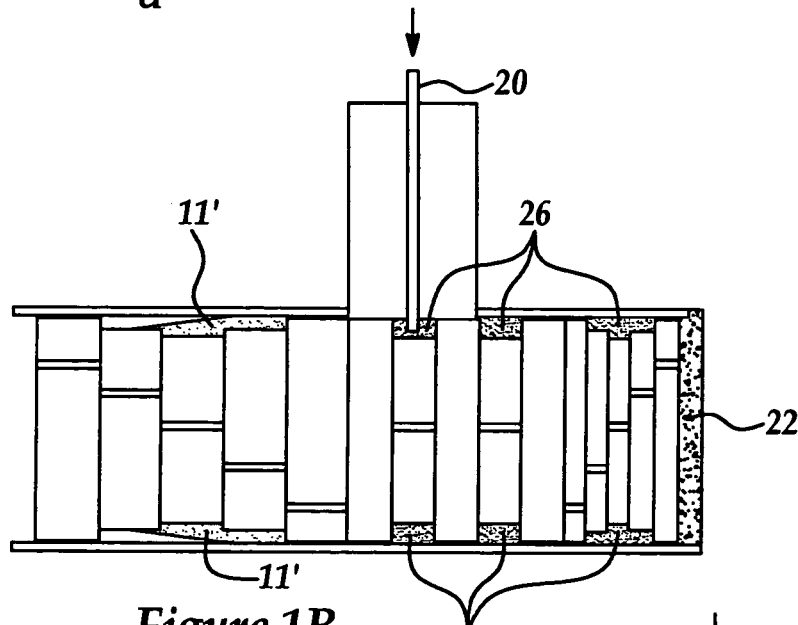
FIG. 1B is an enlarged schematic view of a portion of the extruder shown at 1B in FIG. 1A, depicting an embodiment of the method having a solution introduced into the molten polymeric material within the extruder.
Figure 1C:
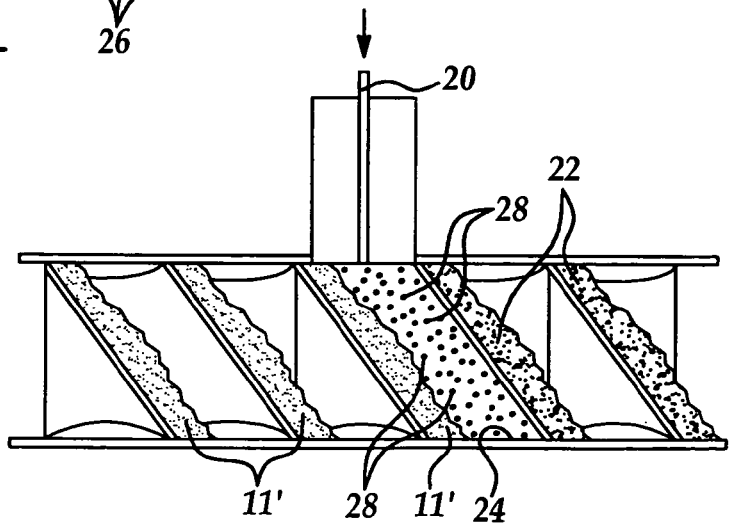
FIG. 1C is an enlarged schematic view of a portion of the extruder shown at 1C in FIG. 1A, depicting an alternate embodiment of the method having a solution introduced into the barrel of the extruder.

Referring now to FIGS. 1A through 1C, a schematic representation of an apparatus and some of the method steps according to embodiments of the present invention are shown. Polymeric material 11 (also denoted generally as "resin" in FIG. 1A) is introduced into an extruder 10 having an entrance 12 and an exit 14. The extruder 10 has a plurality of barrels/cylinders 16 (shown schematically) in fluid communication with a screw 18 rotating therewithin. Generally, the barrel(s) 16 adjacent the entrance 12 is/are considered upstream U, while the barrel(s) 16 adjacent the exit 14 are considered downstream D. It is to be understood that, as flow moves from the entrance 12 toward the exit 14, barrel(s) 16 may be referred to as "downstream" relative to barrel(s) 16 further upstream (similarly, barrel(s) 16 may be referred to as "upstream" relative to barrel(s) further downstream). The polymeric material/resin 11 introduction is via an upstream U barrel 16. It is to be understood that as the polymeric material/resin 11 moves downstream D, the polymeric material 11 becomes molten.

Embodiments of the method include introducing a supercritical fluid solution 20 into the extruder 10 having the molten polymeric material 11' therein.

In an embodiment, the supercritical fluid solution 20 may include a solvent and a nanofiller material. It is contemplated that any suitable supercritical fluid may be used as the solvent. Some non-limiting examples of suitable supercritical fluids include hydrogen, neon, n-pentane, nitrogen, carbon tetrafluoride, chlorotrifluoromethane, cyclohexane, toluene, propane, trichlorofluoromethane, methane, propylene, argon, trifluoromethane, ethane, chlorodifluoromethane, ethylene, oxygen, krypton, xenon, acetylene, nitrous oxide, carbon dioxide, ammonia, water, and mixtures thereof. In a non-limitative embodiment, the supercritical fluid is selected from carbon dioxide, nitrogen, carbon tetrafluoride, chlorotrifluoride, trichlorofluoromethane, argon, trifluoromethane, chlorodifluoromethane, and mixtures thereof.

In its supercritical state (i.e. when above its critical temperature and critical pressure), a compound exists as a fluid having properties of both a liquid and a gas. It is contemplated that the supercritical fluid selected may possess a critical point that is easily obtainable. Table 1 illustrates the critical properties for the above-listed examples.

TABLE 1

Supercritical Fluid Properties

| Fluid | Critical Temperature °K. | Critical Pressure MPa | Critical Temperature °C. | Critical Pressure psig |
|---|---|---|---|---|
| Hydrogen | 33.25 | 1.297 | −239.9 | 188.1 |
| Neon | 44.4 | 2.6545 | −228.8 | 384.9 |
| n-Pentane | 469.7 | 3.37 | 196.6 | 488.7 |
| Nitrogen | 126.24 | 3.398 | −146.9 | 492.7 |
| Carbon Tetrafluoride | 227.6 | 3.74 | −45.6 | 542.3 |
| Chlorotrifluoromethane | 302 | 3.87 | 28.9 | 561.2 |
| Cyclohexane | 553.5 | 4.07 | 280.4 | 590.2 |
| Toluene | 591.8 | 4.1 | 318.7 | 594.5 |
| Propane | 369.85 | 4.247 | 96.7 | 615.8 |
| Trichlorofluoromethane | 471 | 4.41 | 197.9 | 639.5 |
| Methane | 190.55 | 4.595 | −82.6 | 666.3 |
| Propylene | 364.9 | 4.6 | 91.8 | 667.0 |
| Argon | 150.66 | 4.86 | −122.5 | 704.7 |
| Trifluoromethane | 299.3 | 4.86 | 26.2 | 704.7 |
| Ethane | 305.34 | 4.871 | 32.2 | 706.3 |
| Chlorodifluoromethane | 369.27 | 4.967 | 96.1 | 720.2 |
| Ethylene | 282.35 | 5.04 | 9.2 | 730.8 |
| Oxygen | 154.58 | 5.043 | −118.6 | 731.2 |
| Krypton | 209.46 | 5.49 | −63.7 | 796.1 |
| Xenon | 289.7 | 5.87 | 16.6 | 851.2 |
| Acetylene | 308.7 | 6.247 | 35.6 | 905.8 |
| Nitrous Oxide | 309.15 | 7.285 | 36.0 | 1056.3 |
| Carbon Dioxide | 304.17 | 7.386 | 31.0 | 1071.0 |
| Ammonia | 405.5 | 11.35 | 132.4 | 1645.8 |
| Water | 647.3 | 22.12 | 374.2 | 3207.4 |

In a non-limitative embodiment, carbon dioxide is chosen as the supercritical fluid.

It is to be understood that the nanofiller material may be any suitable nanofiller. In an embodiment, the nanofiller is a clay material. Examples of suitable clay materials include, but are not limited to at least one of smectite, hectorite, montmorillonite, bentonite, beidelite, saponite, stevensite, sauconite, nontronite, illite, and mixtures thereof. In an alternate embodiment, the nanofiller is an aluminum silicate smectite clay. Alternately, the nanofiller may include organically modified montmorillonite.

The addition of the nanofiller material (generally having one or more or a plurality of layers) to the supercritical fluid may begin the expansion of the nanofiller material by solubilizing the individual particles therein. This may increase the distance between the one or more layers (e.g. exfoliation) in the nanofiller material.

It is to be understood that the solution 20 may be prepared at an appropriate concentration as required and/or desired for the final nanocomposite material 22. It is contemplated that the amount of nanofiller material in the solution ranges between about 1 wt. % and about 50 wt. %.

Further, the nanofiller material may be added to the supercritical fluid at conditions specified by the selected supercritical fluid such that the supercritical fluid remains supercritical until a phase change is desired and/or required. For example, adding the nanofiller to carbon dioxide may be accomplished at a pressure of about 1071 psig and at a temperature of about 31° C.

Prior to introducing the solution 20 into the extruder 10, the polymeric material 11 is introduced into the extruder 10. It is to be understood that the polymeric material 11 may include any suitable thermoplastic materials. Examples of suitable thermoplastic materials include, but are not limited to thermoplastic olefins (TPO), polyurethanes, polyamides, thermoplastic urethanes, polystyrenes, and mixtures thereof. In an embodiment, the TPOs include, but are not limited to at least one of polypropylene homopolymers, impact modified polypropylenes, ethylene-propylene elastomers, polypropylenes, polyethylenes, elastomers, impact copolymers thereof, and mixtures thereof.

The polymeric material 11 is generally introduced upstream U in the extruder 10 and then moves downstream D during the melting and mixing process. During the melting and mixing stages, the polymeric material 11 is mixed, and may have elastomers substantially well dispersed therein. It is to be understood that the polymeric materials 11 become molten polymeric materials 11'.

Further, it is to be understood that the feed rate of the polymeric material into the extruder 10 may be in any suitable range. In an embodiment, the feed rate may range between about 50 lbs/hour and about 10,000 lbs/hour. Alternately, the feed rate may fall within the following ranges: between about 85 lbs/hour and about 5,000 lbs/hour; between about 80 lbs/hour and about 2,500 lbs/hour; between about 1,000 lbs/hour and about 4,000 lbs/hour; and between about 100 lbs/hour and about 2,000 lbs/hour. In an embodiment, the feed rate is about 100 lbs/hour.

Referring now to FIG. 1B, in an embodiment the solution 20 as previously described is introduced directly into the molten polymeric material 11' within the extruder 10. The introduction of the solution 20 may generally be accomplished via injection. It is to be understood that the solution 20 may be introduced into the molten polymeric material 11' at any suitable upstream U and/or downstream D position in the extruder 10, as desired and/or required.

In FIG. 1C, an alternate embodiment of the method includes introducing the solution 20 into a barrel(s) 16 of the extruder 10. It is to be understood that the barrel(s) 16 may define one or more space(s) 24 between the molten polymeric material 11' and an inside wall of the extruder 10. Further, it is to be understood that the space(s) 24 may be located at any suitable upstream U and/or downstream D position in the extruder 10, as desired and/or required. Additionally, it is within the purview of embodiments of the present invention that the space(s) 24 be of any suitable size, shape, and/or configuration, as desired and/or required.

After the solution 20 is injected into the extruder 10, whether directly into the molten polymeric material 11' or into the barrel 16 of the extruder 10, the method includes the step of causing the supercritical fluid in the solution 20 to substantially instantaneously convert to a gas phase (sometimes referred to as "flashing" to gas). It is contemplated that releasing the pressure in the extruder 10 may cause this substantially instantaneous conversion of supercritical fluid to the gas phase. Without being bound to any theory, it is believed that this release of pressure may aid in the exfoliation of the nanofiller material, which may advantageously result in greater mechanical properties of the final nanocomposite material 22.

In an embodiment in which the solution 20 is injected directly into the molten polymeric material 11' (see FIG. 1B), the solution-injected molten polymeric material 26 moves downstream where the pressure is released and the conversion of the supercritical fluid to gas takes place. It is believed that this conversion to gas causes desirable exfoliation of the nanofiller material within the solution-injected molten polymeric material 26, thereby forming the final nanocomposite material 22 having the nanofiller material substantially homogeneously dispersed therein.

In an embodiment in which the solution 20 is injected into the barrel 16 of the extruder 10 (see FIG. 1C), the supercritical fluid is also caused to convert to a gas phase. In this embodiment, the supercritical fluid is substantially instantaneously converted to a gas phase substantially immediately upon injection into the space 24 in barrel 16. The conversion to gas (generally caused by a decrease in pressure) within the space 24 forms a finely divided powdered nanofiller material 28 on the molten polymeric material 11'. As the molten polymeric material 11' having the powdered nanofiller material 28 thereon passes through remaining (downstream of the solution 20 introduction) sections of the extruder 10, the powdered nanofiller material 28 is incorporated into the molten polymeric material 11', thereby forming the final nanocomposite material 22 having the nanofiller material substantially homogeneously dispersed therein.

In an embodiment, the formed gas phase is captured by a reduced pressure system of the extruder 10. In an alternate embodiment, the formed gas is captured by cooled trapping method, which allows the gas to be reused.

The method may further include passing the nanocomposite material 22 through the extruder 10 in order to exit the extruder 10.

It is to be understood that the processing temperatures and pressures may be in any suitable range such that the supercritical fluid converts to the gas phase at a desired and/or required time. Supercritical fluids offer favorable means to achieve solvating properties, which have both gas and liquid characteristics without changing chemical structure. Until a phase change is desired and/or required, it is important to control the pressure and temperature to obtain a significant range of physiochemical properties without passing through a phase boundary (e.g. liquid to gas). While ultimately dependant on the supercritical fluid selected, the pressure is generally greater than or equal to about 1200 psig.

To further illustrate embodiment(s) of the present invention, the following example is given. It is to be understood that this example is provided for illustrative purposes and is not to be construed as limiting the scope of embodiment(s) of the present invention.

EXAMPLE

A solution is prepared by weighing 25 lbs of an organoclay nanofiller into a heated, pressurizable vessel. The vessel is then closed, and 25 lbs of supercritical $CO_2$ ($scCO_2$) is introduced into the vessel to form a 50% by weight nanoclay colloidal solution. The colloidal solution of organoclay and $scCO_2$ is then agitated for a sufficient amount of time to allow the $scCO_2$ to expand the nanofiller particles. During this time, a standard co-rotating twin-screw extruder is heated to operating temperature. After agitation is complete, the extruder is activated and polymeric resin is fed into the extruder at the rate of 95 lbs/hour. This process is allowed to stabilize. After process stabilization, the $scCO_2$ solution is injected into the molten polymeric resin within the barrel of the extruder at a rate of 10 lbs/hour. During the processing, the $scCO_2$ is substantially instantaneously expanded and converted into a gas phase. The gas moves out of the molten polymeric resin and is captured by the reduced pressure system of the extruder. The conversion of the $scCO_2$ to gas causes the nanofiller to desirably exfoliate in the molten polymeric resin. The polymeric extrudate (nanocomposite material) thus formed and having the nanofiller material substantially homogeneously dispersed therein, is cooled and collected. If the extruder is run in this manner for 5 hours, about 500 lbs of nanocomposite material will be produced with a nanofiller concentration of about 5% by weight.

The method according to embodiments of the present invention offers many advantages. The use of a supercritical fluid to make a non-foam nanocomposite material may advantageously allow the formation process to be relatively fast and less expensive. It is believed, without being bound to any theory, that this is due to the supercritical fluid being eliminated substantially immediately, whereas a solvent needs to be driven off. Further, the supercritical fluid solution may be varied in its introduction in the extruder, depending on the pressures of the extruder. Still further, the method of the present invention offers the advantages of using a foam processing method without actually making a foam. It is believed that the expansion of gas aids in the exfoliation of the nanofiller material, thus advantageously resulting in greater mechanical properties of the nanocomposite material.

While several embodiments of the invention have been described in detail, it will be apparent to those skilled in the art that the disclosed embodiments may be modified. Therefore, the foregoing description is to be considered exemplary rather than limiting.

The invention claimed is:

1. A method for making a nanocomposite material, the method comprising the steps of:
   providing a molten polymeric material in an extruder;
   introducing a solution including a nanofiller material and a supercritical fluid into a molten polymeric material; and
   causing the supercritical fluid within the solution to substantially instantaneously convert to a gas phase, thereby forming the nanocomposite material having the nanofiller material substantially homogeneously dispersed therein.

2. The method as defined in claim 1, further comprising the step of passing the nanocomposite material through the extruder.

3. The method as defined in claim 1 wherein the supercritical fluid comprises at least one of hydrogen, neon, n-pentane, nitrogen, carbon tetrafluoride, chlorotrifluoromethane, cyclohexane, toluene, propane, trichlorofluoromethane, methane, propylene, argon, trifluoromethane, ethane, chlorodifluoromethane, ethylene, oxygen, krypton, xenon, acetylene, nitrous oxide, carbon dioxide, ammonia, water, and mixtures thereof.

4. The method as defined in claim 1 wherein the supercritical fluid comprises at least one of carbon dioxide, nitrogen, carbon tetrafluoride, chlorotrifluoride, trichlorofluoromethane, argon, trifluoromethane, chlorodifluoromethane, and mixtures thereof.

5. The method as defined in claim 1 wherein the nanofiller material comprises a clay including at least one of smectite clay, an illite clay, and mixtures thereof.

6. The method as defined in claim 1 wherein the supercritical fluid expands the nanofiller material by increasing a distance between at least two layers in the nanofiller material.

7. The method as defined in claim 1 wherein the solution has a nanofiller material concentration ranging between about 1 wt. % and about 50 wt. %.

8. The method as defined in claim 1 wherein the introducing step is accomplished by injecting the solution directly into the molten polymeric material.

9. The method as defined in claim 8 wherein causing the supercritical fluid to substantially instantaneously convert to the gas phase is accomplished by releasing pressure within the extruder, thereby aiding in exfoliation of the nanofiller material.

10. The method as defined in claim 1 wherein the pressure is greater than about 1200 psig.

11. The method as defined in claim 1 wherein the molten polymeric material comprises thermoplastic materials.

12. The method as defined in claim 11 wherein the thermoplastic materials comprise at least one of thermoplastic olefins, polyamides, thermoplastic urethanes, polystyrenes, and mixtures thereof.

13. The method as defined in claim 12 wherein the thermoplastic olefins comprise at least one of polypropylenes, polypropylene homopolymers, ethylene-propylene elastomers, polyethylenes, elastomers, impact copolymers thereof, and mixtures thereof.

14. A method for making a nanocomposite material, the method comprising the steps of:
providing a molten polymeric material in an extruder;
introducing a solution including a nanofiller material and a supercritical fluid into a barrel of an extruder having a molten polymeric material therein;
causing the supercritical fluid within the solution to substantially instantaneously convert to a gas phase, thereby forming a powdered nanofiller material on the molten polymeric material; and
passing the molten polymeric material having the powdered nanofiller material thereon through the extruder, thereby forming the nanocomposite material having the nanofiller material substantially homogeneously dispersed therein.

15. The method as defined in claim 14 wherein causing the supercritical fluid to substantially instantaneously convert to the gas phase is accomplished by releasing pressure within the extruder substantially upon introduction.

16. The method as defined in claim 14 wherein a space is defined between the molten polymeric material and an inside wall of the barrel, and wherein the solution is introduced into the space.

17. The method as defined in claim 14 wherein the molten polymeric material comprises a thermoplastic material comprising at least one of thermoplastic olefins, polyamides, thermoplastic urethanes, polystyrenes, and mixtures thereof.

18. The method as defined in claim 17 wherein the thermoplastic olefins comprise at least one of polypropylenes, polypropylene homopolymers, ethylene-propylene elastomers, polyethylenes, elastomers, impact copolymers thereof, and mixtures thereof.

19. The method as defined in claim 14 wherein the supercritical fluid comprises at least one of hydrogen, neon, n-pentane, nitrogen, carbon tetrafluoride, chlorotrifluoromethane, cyclohexane, toluene, propane, trichlorofluoromethane, methane, propylene, argon, trifluoromethane, ethane, chlorodifluoromethane, ethylene, oxygen, krypton, xenon, acetylene, nitrous oxide, carbon dioxide, ammonia, water, and mixtures thereof.

20. The method as defined in claim 14 wherein the supercritical fluid comprises at least one of carbon dioxide, nitrogen, carbon tetrafluoride, chlorotrifluoride, trichlorofluoromethane, argon, trifluoromethane, chlorodifluoromethane, and mixtures thereof.

21. The method as defined in claim 14 wherein the nanofiller material comprises a clay is selected from a smectite clay, and mixtures thereof.

22. A method for making a nanocomposite material, the method comprising the steps of:
preparing a solution having a nanofiller material and a supercritical fluid therein;
introducing a polymeric material into an extruder, wherein the polymeric material becomes molten downstream in the extruder;
injecting the solution into the molten polymeric material; and
releasing pressure in the extruder, thereby causing the supercritical fluid to substantially instantaneously convert to a gas phase, wherein the nanocomposite material having the nanofiller material substantially homogeneously dispersed therein is formed, and wherein the gas phase aids in exfoliation of the nanofiller material.

23. The method as defined in claim 22 wherein the polymeric material is fed into an upstream end of the extruder.

24. The method as defined in claim 22 wherein the polymeric material is fed into the extruder at a rate rangeing between about 50 lbs/hour and about 10,000 lbs/hour.

25. The method as defined in claim 22 wherein the polymeric material comprises a thermoplastic material comprising at least one of thermoplastic olefins, polyamides, thermoplastic urethanes, polystyrenes, and mixtures thereof.

26. The method as defined in claim 22 wherein the supercritical fluid comprises at least one of hydrogen, neon, n-pentane, nitrogen, carbon tetrafluoride, chlorotrifluoromethane, cyclohexane, toluene, propane, trichlorofluoromethane, methane, propylene, argon, trifluoromethane, ethane, chlorodifluoromethane, ethylene, oxygen, krypton, xenon, acetylene, nitrous oxide, carbon dioxide, ammonia, water, and mixtures thereof.

27. The method as defined in claim 22 wherein the supercritical fluid comprises at least one of carbon dioxide, nitrogen, carbon tetrafluoride, chlorotrifluoride, trichlorofluoromethane, argon, trifluoromethane, chlorodifluoromethane, and mixtures thereof.

28. A method for making a nanocomposite material, the method comprising the steps of:
preparing a supercritical solution having a nanofiller material and solvent therein;
introducing a polymeric material into an extruder, wherein the polymeric material becomes molten downstream in the extruder;
injecting the supercritical solution into a space within a barrel of the extruder, the space being defined between the molten polymeric material and an inside wall of the barrel;
releasing pressure in the extruder, thereby forming a finely divided, powdered nanofiller material on the molten polymeric material; and
passing the molten polymeric material having the powdered nanofiller material thereon through remaining sections of the extruder, thereby forming the nanocomposite material having the nanofiller material substantially homogeneously dispersed therein.

29. The method as defined in claim 28 wherein the supercritical fluid comprises at least one of hydrogen, neon, n-pentane, nitrogen, carbon tetrafluoride, chlorotrifluoromethane, cyclohexane, toluene, propane, trichlorofluoromethane, methane, propylene, argon, trifluoromethane, ethane, chlorodifluoromethane, ethylene, oxygen, krypton, xenon, acetylene, nitrous oxide, carbon dioxide, ammonia, water, and mixtures thereof.

30. The method as defined in claim 28 wherein the solvent is a supercritical fluid comprising at least one of carbon dioxide, nitrogen, carbon tetrafluoride, chlorotrifluoride, trichlorofluoromethane, argon, trifluoromethane, chlorodifluoromethane, and mixtures thereof.

31. The method as defined in claim 28 wherein the nanofiller material comprises a clay selected from a smectite clay, an illite clay, and mixtures thereof.

32. The method as defined in claim 28 wherein the injecting and releasing occur substantially simultaneously.

33. The method as defined in claim 5 wherein the smectite clay is selected from hectorite, montmorillonite, bentonite, beidelite, saponite, stevensite, sauconite, nontronite, and mixtures thereof.

34. The method as defined in claim 21 wherein the smectite clay is selected from hectorite, montmorillonite, bentonite, beidelite, saponite, stevensite, sauconite, nontronite, and mixtures thereof.

35. The method as defined in claim 31 wherein the smectite clay is selected from hectorite, montmorillonite, bentonite, beidelite, saponite, stevensite, sauconite, nontronite, and mixtures thereof.

* * * * *